United States Patent [19]

Hashiguchi et al.

[11] Patent Number: 4,630,589
[45] Date of Patent: Dec. 23, 1986

[54] EXHAUST GAS RECIRCULATION METHOD FOR INTERNAL COMBUSTION ENGINES

[75] Inventors: Makoto Hashiguchi, Kawagoe; Yohji Fukutomi, Sayama, both of Japan

[73] Assignee: Honda Giken Kogyo K.K., Tokyo, Japan

[21] Appl. No.: 773,818

[22] Filed: Sep. 9, 1985

[30] Foreign Application Priority Data

Sep. 11, 1984 [JP] Japan .................. 59-188948

[51] Int. Cl.⁴ .......................................... F02M 25/06
[52] U.S. Cl. .................................................. 123/571
[58] Field of Search .................... 123/568, 571; 60/278

[56] References Cited

U.S. PATENT DOCUMENTS

| | | | |
|---|---|---|---|
| 4,375,800 | 3/1983 | Otsuka et al. | 123/571 |
| 4,409,948 | 10/1983 | Hasegawa et al. | 123/571 |
| 4,454,854 | 6/1984 | Gotoh et al. | 123/571 |
| 4,541,398 | 9/1985 | Kishi | 123/571 |

Primary Examiner—Willis R. Wolfe, Jr.
Attorney, Agent, or Firm—Arthur L. Lessler

[57] ABSTRACT

A method of controlling exhaust gas recirculation in an internal combustion engine, by means of an exhaust gas recirculation control system including an exhaust recirculating passage connected between the exhaust passage and the intake passage of the engine, an exhaust gas recirculating valve arranged across the exhaust gas recirculating passage, and differential pressure-operated actuator device for varying the opening of the exhaust gas recirculating valve. The differential pressure-operated actuator device has a pressure-responsive member displaceable in response to a pressure difference between atmospheric pressure applied to one side surface thereof and a synthetic pressure of pressure within the intake passage and atmospheric pressure, applied to the other side surface thereof. The differential pressure-operated actuator device is adapted to vary the synthetic pressure in response to at least one operating parameter of the engine to control the exhaust gas recirculating valve. The atmospheric pressure and the pressure within the intake passage at a zone downstream of the throttle valve are detected. When the difference between the detected atmospheric pressure and the detected intake passage pressure is smaller than a predetermined value, the exhaust gas recirculating valve is controlled to a fully closed position.

4 Claims, 4 Drawing Figures

EXHAUST GAS RECIRCULATION METHOD FOR INTERNAL COMBUSTION ENGINES

BACKGROUND OF THE INVENTION

This invention relates to an exhaust gas recirculation method for internal combustion engines, which is capable of achieving stable operation of the engine under low atmospheric pressure such as at high altitude.

Exhaust gas recirculation, i.e so-called EGR, is widely employed in internal combustion engines wherein part of exhaust gases from the engine is returned to the intake passage of the engine so as to reduce nitrogen oxides (NOx), one of noxious gases emitted from the engine. It has also been widely employed to detect the opening of an exhaust recirculating valve arranged in an exhaust gas recirculating passage, and control the exhaust gas recirculating valve so that the detected valve opening value becomes equal to a desired valve opening value to thereby attain optimal amounts of exhaust gas recirculation approriate to operating conditions of the engine.

Conventionally known actuator means for actuating the exhaust gas recirculating valve include a differential pressure-operated type which typically comprises a diaphragm connected to the exhaust gas recirculating valve, an atmospheric pressure passage for guiding atmospheric air or atmospheric pressure to one side surface of the diaphragm, a negative pressure passage for guiding vacuum or negative pressure developed in the intake passage of the engine at a location downstream of a throttle valve therein, to the other side surface of the diaphragm, and a second atmospheric pressure passage for guiding atmospheric pressure to the other side surface of the diaphragm, a solenoid valve arranged across the negative pressure passage or the second atmospheric pressure passage, and a control circuit for supplying a control signal to the solenoid valve for controlling same, wherein the diaphragm is displaceable in response to a pressure difference between atmospheric pressure applied to the one side surface thereof and a synthetic pressure formed by the negative pressure and atmospheric pressure, applied to the other side surface thereof, to thereby control the opening of the exhaust gas recirculating valve.

With the above construction of the actuator means for the exhaust gas recirculating valve, however, when the engine is operating at a high altitude, the pressure difference between pressures applied to the both side surfaces of the diaphragm is small due to low atmospheric pressure, often causing the phenomenon that even when the solenoid valve is supplied with a control signal commanding opening of the exhaust gas recirculating valve from the control circuit, the diaphragm is not displaced through a required stroke at all, so that the actual valve opening of the exhaust gas recirculating valve does not approach the desired or command value. As a result, at such high altitude, it is not possible to reduce the amount of NOx in the exhaust gases. Besides, since even on such occasion fuel is supplied to the engine in an amount commensurate with the desired command value of exhaust gas recirculation, a lean air-fuel mixture will be supplied to the engine if the exhaust gas recirculating valve is not opened to the desired command value, often causing unstable operation of the engine. Moreover, the solenoid valve is continually supplied with energizing current from the control circuit even when the exhaust gas recirculating valve is not opened to the desired command value, badly affecting the effective life of the solenoid valve.

SUMMARY OF THE INVENTION

It is therefore the object of the invention to provide an exhaust gas recirculation method for internal combustion engines, which is adapted to interrupt the exhaust gas recirculation when the engine is operating under low atmospheric pressure such as at a high altitude to thereby prevent unstable operation of the engine and ensure a long effective life of the solenoid valve.

The present invention provides a method of controlling exhaust gas recirculation in an internal combustion engine having an exhaust passage, an intake passage, and a throttle valve arranged in the intake passage, by means of an exhaust gas recirculation control system including an exhaust recirculating passage connected between the exhaust passage and the intake passage, an exhaust gas recirculating valve arranged across the exhaust gas recirculating passage, and differential pressure-operated actuator means for varying the opening of the exhaust gas recirculating valve. The differential pressure-operated actuator means has a pressure-responsive member having one side surface acted upon by atmospheric pressure, and another side surface by a synthetic pressure of pressure within the intake passage at a zone downsteam of the throttle valve and atmospheric pressure wherein the pressure-responsive member is displaceable in response to a pressure difference between the atmospheric pressure applied to the one side surface thereof and the synthetic pressure of the intake passage pressure and the atmospheric pressure, applied to the another side surface thereof. The differential pressure-operated actuator means is adapted to vary the synthetic pressure in response to at least one operating parameter of the engine to control the exhaust gas recirculating valve.

The method according to the invention is characterized by comprising the following steps: (1) detecting atmospheric pressure and the pressure within the intake passage at said zone downstream of the throttle valve; (2) determining a difference between the detected value of atmospheric pressure and the detected value of the pressure within the intake passage; and (3) controlling the exhaust gas recirculating valve to a fully closed position when the above pressure difference is smaller than a predetermined value.

The differential pressure-operated actuator means includes an atmospheric pressure passage for guiding atmospheric pressure to the one side surface of the pressure-responsive member, a negative pressure passage for guiding the above-mentioned pressure within the intake passage of the engine at the zone downstream of the throttle valve, to the another side surface of the pressure-responsive member, and a second atmospheric pressure passage for guiding atmospheric pressure to the another side surface of the pressure-responsive member, a solenoid valve arranged across at least one of the negative pressure passage and the second atmospheric pressure passage, and a control circuit responsive to the aforementioned at least one operating parameter of the engine for controlling the solenoid valve, to thereby control the opening of the exhaust gas recirculating valve. The solenoid valve is disposed to selectively guide the atmospheric pressure and the pressure within the intake passage to the another side surface of the pressure-responsive member. Alternatively, the solenoid valve may be disposed to adjust the amount of one of the atmospheric pressure and the pressure within the intake passage to be supplied to the another side surface of the pressure-responsive member, while allowing permanent supply of the other of the atmospheric pressure and the pressure within the intake passage to the another side surface of the pressure-responsive member.

The above and other objects, features and advantages of the invention will be more apparent from the ensuing detailed description taken in conjunction with the accompanying drawings.

DETAILED DESCRIPTION

The method of the invention will now be described in detail with reference to the drawings.

Figure 1:
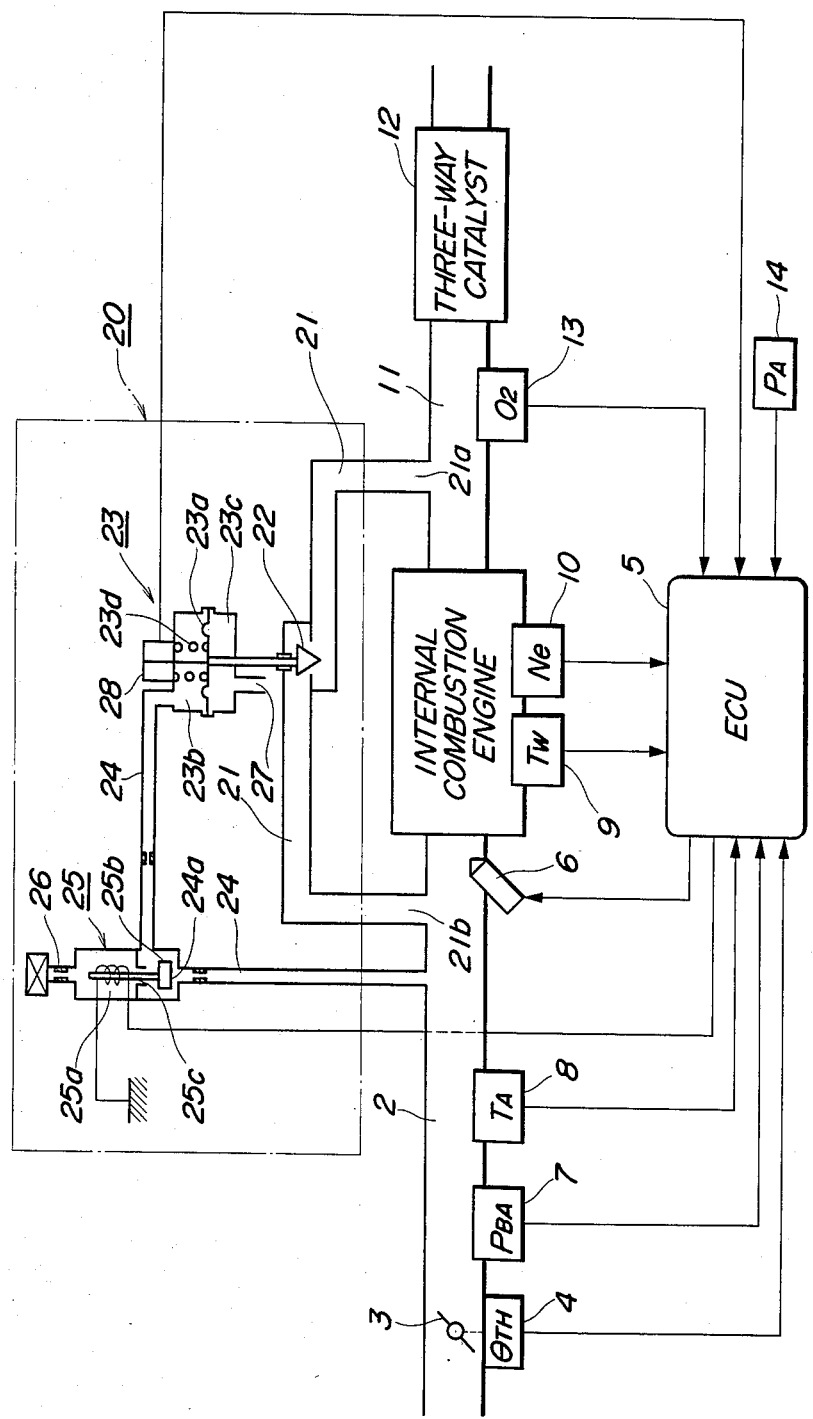
FIG. 1 is a block diagram of the whole arrangement of an internal combustion engine equipped with an exhaust gas recirculation control system to which is applied the method according to the invention.

Referring first to FIG. 1, there is illustrated the whole arrangement of an exhaust gas recirculation control system in an internal combustion engine, to which is applied the method according to the invention. Reference numeral 1 designates an internal combustion engine which may be a four-cylinder type, for instance. An intake pipe 2 is connected to the cylinder block of the engine 1, in which is arranged a throttle valve 3, which in turn is coupled to a throttle valve opening (th) sensor 4 for detecting its valve opening and converting same into an electrical signal supplied to an electronic control unit (hereinafter called "the ECU") 5.

Fuel injection valves 6 are arranged in the intake pipe 2 at locations intermediate between the engine body 1 and the throttle valve 3, which are provided, respectively, for cylinders, not shown, of the engine and projected into the intake pipe 2 at locations lightly upstream of respective intake valves. Each of the fuel injection vales 6 is connected to a fuel pump, not shown, and electrically connected to the ECU 5 to have their valve opening periods for fuel injection controlled by drive signals therefrom.

An absolute pressure (PBA) sensor 7 is connected to the intake pipe 2 at a location downstream of the throttle valve 3, to supply an electrical output signal indicative of detected absolute pressure in the intake pipe 2 to the ECU 5. An intake air temperature sensor 8 is connected to the intake pipe 2 at a location downstream of the absolute pressure sensor 7 to supply an electrical output signal indicative of detected intake air temperature to the ECU 5.

An engine coolant temperature (TW) sensor 10, which may be formed of a thermistor or the like, is mounted on the cylinder block of the engine 1 in a manner embedded in the peripheral wall of an engine cylinder having its interior filled with cooling water, an electrical output signal of which is supplied to the ECU 5.

An engine rotational speed (Ne) sensor (hereinafter called "the Ne sensor") 10 is arranged in facing relation to a camshaft, not shown, of the engine 1 or a crankshaft of same, not shown. The Ne sensor 10 is adapted to generate one pulse at one of particular crank angles of the engine each time the engine crankshaft rotates through 180 degrees, as a pulse indicative of a top-dead-center position (TDC signal). These pulses from the Ne sensor 10 are supplied to the ECU 5.

A three-way catalyst 12 is arranged in an exhaust pipe 11 extending from the cylinder block of the engine 1 for purifying ingredients HC, CO and NOx contained in the exhaust gases. An $O_2$ sensor 13 is inserted into the exhaust pipe 11 at a location upstream of the three-way catalyst 12 for detecting the concentration of oxygen in the exhaust gases and supplying an electrical signal indicative of a detected concentration value to the ECU 5.

Further connected to the ECU 5 is an atmospheric pressure (PA) sensor 14 for detecting atmospheric pressure, to supply an electrical output signal indicative of detected atmospheric pressure to the ECU 5. An exhaust gas recirculation mechanism 20 forming part of the exhaust gas recirculation control system will now be described. An exhaust gas recirculating passage 21 is connected at one end 21a to the exhaust pipe 11 at a location upstream of the three-way catalyst 12, and at the other end 21b to the intake pipe 2 at a location downstream of the throttle valve 3. An exhaust gas recirculating valve 22 is arranged across the exhaust gas recirculating passage 21 for regulating or varying the amount of exhaust gases being returned to the intake pipe 2. The exhaust gas recirculating valve 22 has its valve body operatively coupled to a diaphragm 23a of a negative pressure-responsive actuator device 23. The actuator device 23 has a negative pressure chamber 23b and a lower or atmospheric pressure chamber 23c partly defined by the diaphragm 23a. A spring 23d is arranged in the negative pressure chamber 23b and urges the diaphragm 23a in the direction of closing the exhaust gas recirculating valve 22. The lower chamber 23c is communicated with the atmosphere by way of an air or atmospheric pressure passage 27, while the negative pressure chamber 23b is communicated with the interior of the intake pipe 2 at a location downstream of the throttle valve 3 by way of a negative pressure passage 24 having restrictions therein. A three-way solenoid valve 25 is arranged across the negative pressure passage 24, which has a solenoid 25a electrically connected to the ECU 5, a valve body 25b displaceable in response to energization and deenergization of the solenoid 25a to close and open an opening 25c communicating with the atmosphere via an atmospheric pressure passage 26 provided with a filter and a restriction therein. When the solenoid 25a is energized, the valve body 25b is displaced to close the opening 25c and simultaneously open the negative pressure passage 24 at an opening 24a so that negative pressure or vacuum developed in the intake pipe 2 at a zone downstream of the throttle valve 3 is delivered into the negative pressure chamber 23b of the negative pressure-operated actuator device 23. As a result, there will be developed a difference between pressures acting upon the opposite side surfaces of the diaphragm 23a so that the diaphragm 23a is displaced against the force of the spring 23d to open the exhaust gas recirculating valve 22. More specifically, with energization of the solenoid 25a of the three-way valve 25, the exhaust gas recirculating valve 22 has its valve opening increased to allow an increased amount of exhaust gases to flow through the exhaust gas recirculating passage 21 to the intake pipe 2. On the other hand, when the solenoid 25a of the three-way valve 25 is deenergized, the valve body 25b is displaced to close the opening 24a of the negative pressure passage 24 and simultaneously open the opening 25c so that atmospheric pressure is introduced into the negative pressure chamber 23b of the negative pressure-responsive actuator device 23. On this occasion, the pressure difference between pressures acting upon the opposite side surfaces of the diaphragm 23a becomes almost zero whereby the diaphragm 23a is displaced by the force of the spring 23d to bring the exhaust gas recirculating valve 22 into a fully closed position. As long as the solenoid 25a of the three-way valve 25 continues to be thus energized, the exhaust gas recirculating valve 22 is kept fully closed to interrupt the exhaust gas recirculation.

In FIG. 1, reference numeral 28 designates a valve lift sensor connected to the diaphragm 23a of the negative pressure-responsive actuator device 23 for detecting the displacement of the diaphragm 23a, that is, the actual valve opening of the exhaust gas recirculating valve 22. This sensor 28 is also electrically connected to the ECU 5.

The ECU 5 determines operating conditions of the engine on the basis of various engine operating parameter signals from the aforementioned sensors, sets a desired valve opening command value LCMD for the exhaust gas recirculating valve 22 as a function of the intake pipe absolute pressure PBA and the engine rotational speed Ne, and supplies a control signal in the form of on-off pulses to the three-way valve 25 to energize same so as to make the difference between the desired valve opening command value LCMD and the actual valve opening value LACT of the exhaust gas recirculating valve 22 zero. The ECU 5 further calculates the fuel injection period, i.e. the valve opening period TOUT for the fuel injection valves 6, by the use of the following equation:

$$TOUT = Ti \times K1 + K2 \quad (1)$$

where Ti represents a basic value of the fuel injection period, which is calculated as a function of the intake passage absolute pressure PBA and the engine rpm Ne as well as in dependence on whether or not the three-way solenoid valve 25 for controlling the exhaust gas recirculating amount is operating, as hereinafter described. K1 and K2 represent correction coefficients and correction variables having their values dependent upon the values of signals from the aforementioned various sensors, that is, the throttle valve opening sensor 4, the intake passage absolute pressure sensor 7, the intake air temperature sensor 8, the engine coolant temperature sensor 9, the Ne sensor 10, the $O_2$ sensor 13, and the atmospheric pressure sensor 14, and are calculated by the use of predetermined equations so as to optimize the startability, emission characteristics, fuel consumption, accelerability, etc. of the engine.

The ECU 5 supplies driving signals to the fuel injection valves 6 to open same for a period of time corresponding to the valve opening period TOUT calculated in the manner described above.

Figure 2:
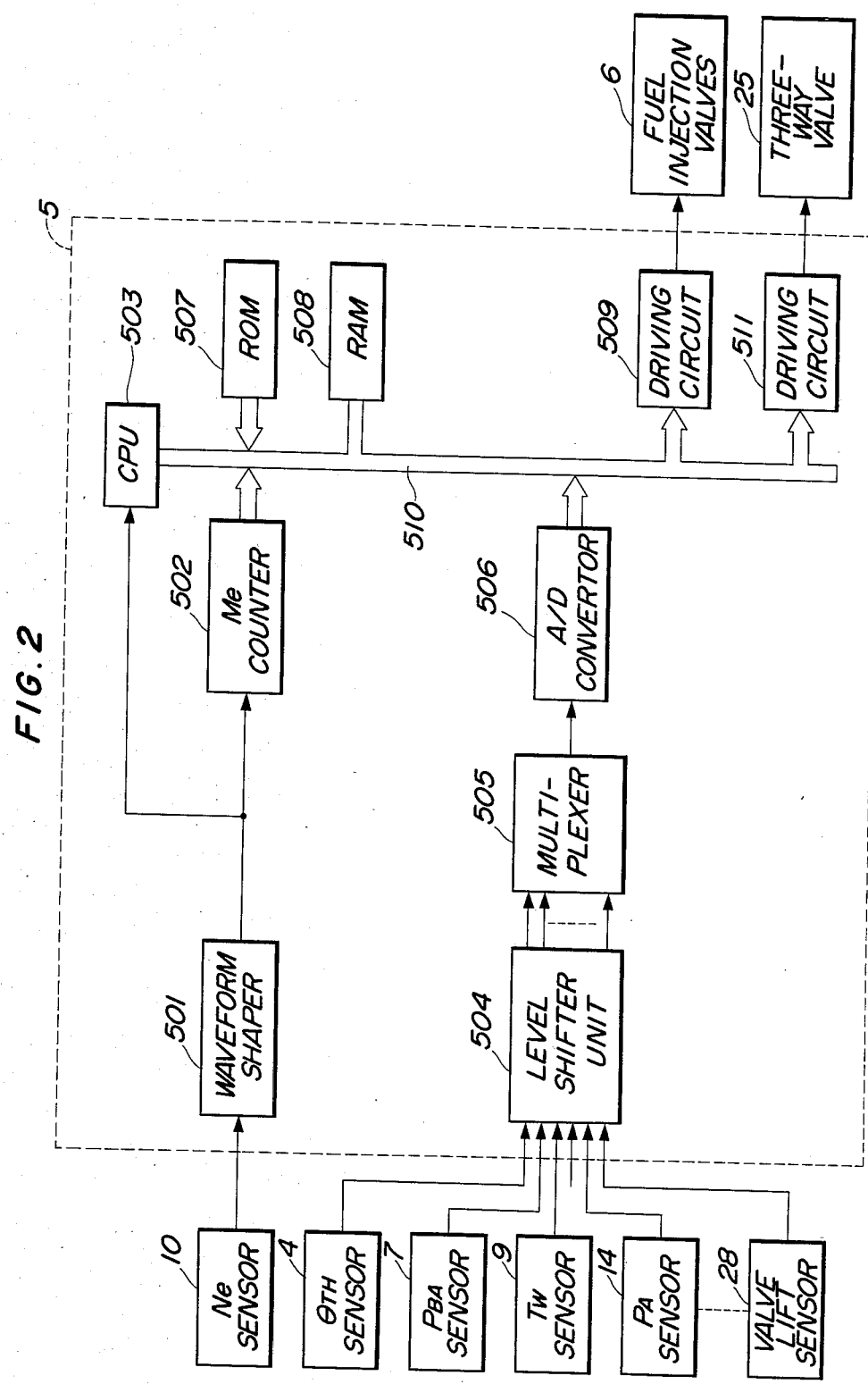
FIG. 2 is a circuit diagram of the internal configuration of an electronic control unit (ECU) appearing in FIG. 1.

FIG. 2 shows an electrical circuit within the ECU 5 in FIG. 1. An output signal from the Ne sensor 10 in FIG. 1 is applied to a waveform shaper unit 501, wherein its pulse waveform is shaped, and the shaped signal is successively supplied to a central processing unit (hereinafter called "the CPU") 503 as an interrupt signal for starting a program shown in FIG. 3, as well as to an Me value counter 502, as the TDC signal. The Me value counter 502 counts the time interval between a preceding pulse of the TDC signal and a present pulse of the same signal, inputted thereto from the Ne sensor 10. Therefore, its counted value Me corresponds to the reciprocal of the actual engine rotational speed Ne. The Me value counter 502 supplies the counted value Me to the CPU 503 via a data bus 510.

The respective output signals from the throttle valve opening sensor 4, the intake pipe absolute pressure sensor 7, the engine coolant temperature sensor 9, the valve lift sensor 28, and other engine operating parameter sensors, not shown, have their voltage levels shifted to a predetermined voltage level by a level shifter unit 504 and successively applied to an analog-to-digital converter 506 through a multiplexer 505. The analog-to-digital converter 506 successively converts into digital signals analog output voltages from the aforementioned various sensors, and the resulting digital signals are supplied to the CPU 503 via the data bus 510.

Further connected to the CPU 503 via the data bus 510 are a read-only memory (hereinafter called "the ROM") 507, a random access memory (hereinafter called "the RAM") 508, and driving circuits 509 and 511. The RAM 508 temporarily stores various calculated values from the CPU 503, while the ROM 507 stores control programs to be executed within the CPU 503 such as one for controlling the exhaust gas recirculation, as hereinafter described.

The CPU 503 executes the control programs in such a manner that it is responsive to output signals from the various engine operating parameter sensors to determine operating conditions of the engine, supply a control signal to the driving circuit 511, which in turn supplies a corresponding driving signal to the three-way solenoid valve 25 for on-off control of same to thereby control the exhaust gas recirculating amount, while it calculates the fuel injection period TOUT for the fuel injection valves 6 in response to the determined operating conditions of the engine, and supplies the calculated value to the driving circuit 509 via the data bus 510. The driving circuit 509 is responsive to the calculated value to supply a control signal to the fuel injection valves 6 to open same.

Figure 3:
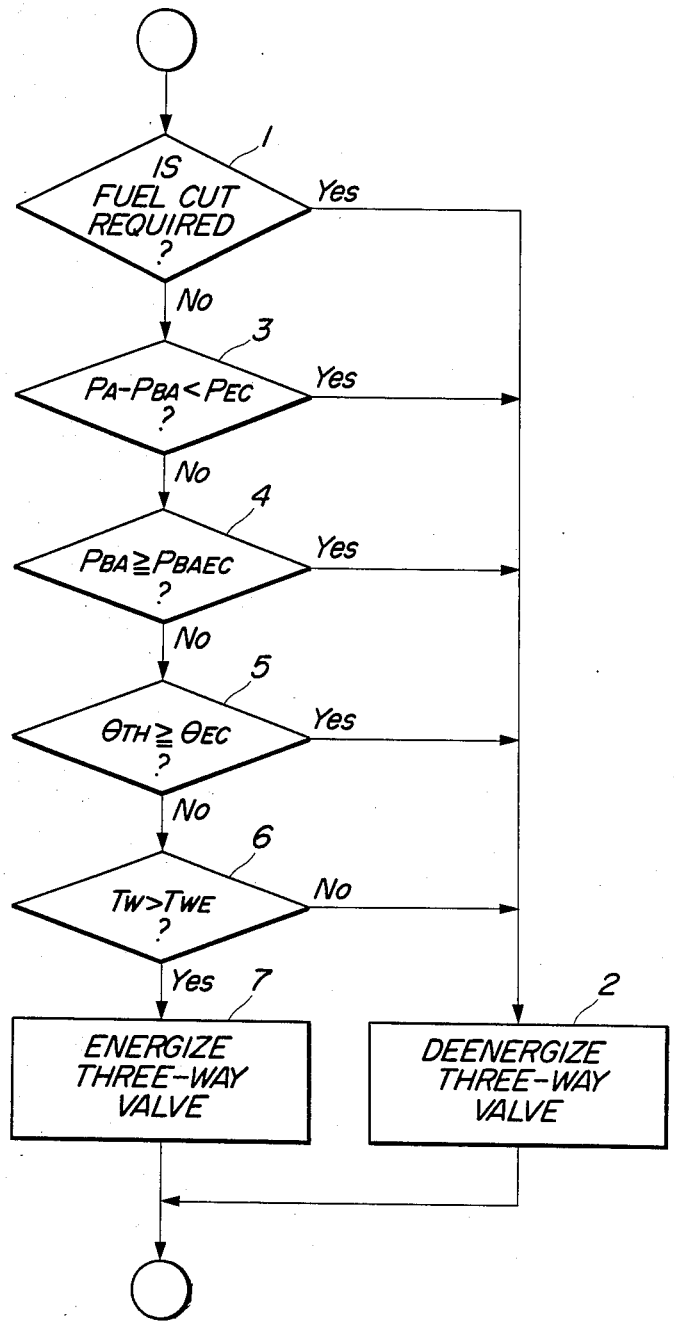
FIG. 3 is a flowchart of a manner of controlling the exhaust gas recirculation according to the method of the invention.

FIG. 3 shows a flowchart showing the exhaust gas recirculation control method of the invention, i.e. a manner of controlling the three-way solenoid valve, to be executed by the CPU 503 in FIG. 2.

It is first determined at step 1 whether or not the engine is decelerating in a fuel cut-effecting region. When the engine is operating in the fuel cut-effecting region, no fuel is supplied to the engine and accordingly NOx is not emitted from the engine. Therefore, when the engine is in the fuel cut-effecting region, that is, if the answer to the question of step 1 is affirmative, the solenoid 25a of the three-way solenoid valve 25 is deenergized at step 2 to interrupt the exhaust gas recirculation.

If the answer to the question of step 1 is negative, that is, if the engine is not in the fuel cut-effecting region, the program proceeds to step 3 wherein it is determined whether or not a difference (PA−PBA) between the detected atmospheric pressure value PA and the detected intake pipe absolute pressure value PBA is smaller than a predetermined value PEC. The predetermined value PEC is set at the minimum value of the pressure difference between pressures acting upon the opposite side surfaces of the diaphragm 23a, that can cause displacement of the diaphragm 23a in the direction in which the exhaust gas recirculating valve 22 is opened, against the force of the spring 23d, and preferably it is set at a value slightly larger than the minimum value for positive control of the exhaust gas recirculating valve 22. If the answer to the question of step 3 is affirmative or yes, that is, if the differential pressure value (PA−PBA) acting upon the diaphragm 23a in the direction in which the valve 22 is opened is less than the predetermined value PEC, the program proceeds to step 2, referred to above, to deenergize the solenoid 25a of the three-way solenoid valve 25. This can eliminate inaccurate and unstable opening and closing actions of the exhaust gas recirculating valve 22 which can take place under low atmospheric pressure conditions such as at high altitudes, to thereby enhance the operational stability of the engine, and also reduces the supply of unnecessary energizing current to the solenoid 25a, prolonging the effective life of the three-way solenoid valve 25.

If the answer to the question of step 3 is negative or no, it is determined at steps 4 and 5 whether or not the engine is operating in a high load condition. More specifically, in step 4, whether the detected intake pipe absolute pressure PBA is larger than a predetermined value PBAEC (e.g. 650 mmHg) is determined. If the answer is yes, it is judged that the engine is operating in the high load condition, and then the three-way solenoid valve 25 is deenergized at step 2 to interrupt the exhaust gas recirculation, thereby preventing a drop in the engine output which would otherwise be caused by the exhaust gas recirculation. In step 5, whether the detected throttle valve opening θth is larger than a predetermined value θEC (e.g. 55°) is determined. If the answer is yes, it is judged that the engine is operating in the high load condition, the program proceeds to step 2 to deenergize the three-way solenoid valve 25 to interrupt the exhaust gas recirculation.

If the determinations at steps 4 and 5 both provide negative answers, the program proceeds to step 6 wherein it is determined whether or not the detected engine coolant temperaturte TW is higher than a predetermined value TWE (e.g. 75° C.). If the engine coolant temperature TW is lower than the predetermined value TWE, it is assumed that the engine is then being warmed up, and then the program also proceeds to step 2 to interrupt the exhaust gas recirculation, because if exhaust gas recirculation is carried out when the engine is being warmed up, the operation of the engine can become unstable, often causing engine stalling. On the other hand, if the answer to the question of step 6 is affirmative, it is judged that the engine has been warmed up. Thus, all the conditions for starting the exhaust gas recirculation have been fulfilled, and then the program proceeds to step 7 to carry out duty ratio control of the threeway solenoid valve 25 in response to the difference between a valve opening command value LCMD for the exhaust gas recirculating valve 22 and the actual valve opening value LACT of the valve 22. Depending upon which of the step 2 and the step 7 is to be executed, that is, whether or not the exhaust gas recirculation is to be carried out, one of two different tables of basic fuel injection period is selected, the tables being provided with basic fuel injection period values appropriate to operating conditions of the engine when the exhaust gas recirculation is effected and different ones when it is not effected, respectively. Basic fuel injection period values of the table selected when the step 7 is executed are smaller than corresponding ones of the other table selected when the step 2 is executed, at the same values of intake pipe absolute pressure PBA and engine rotational speed Ne, provided that the same air-fuel ratio is to be attained.

The predetermined values used for the comparisons in the steps 1, and 3–6 may each be provided with a hysteresis margin, that is, it may be set to different values between at entrance into the exhaust gas recirculating region and at departure therefrom, so as to ensure smooth driveability of the engine.

Figure 4:
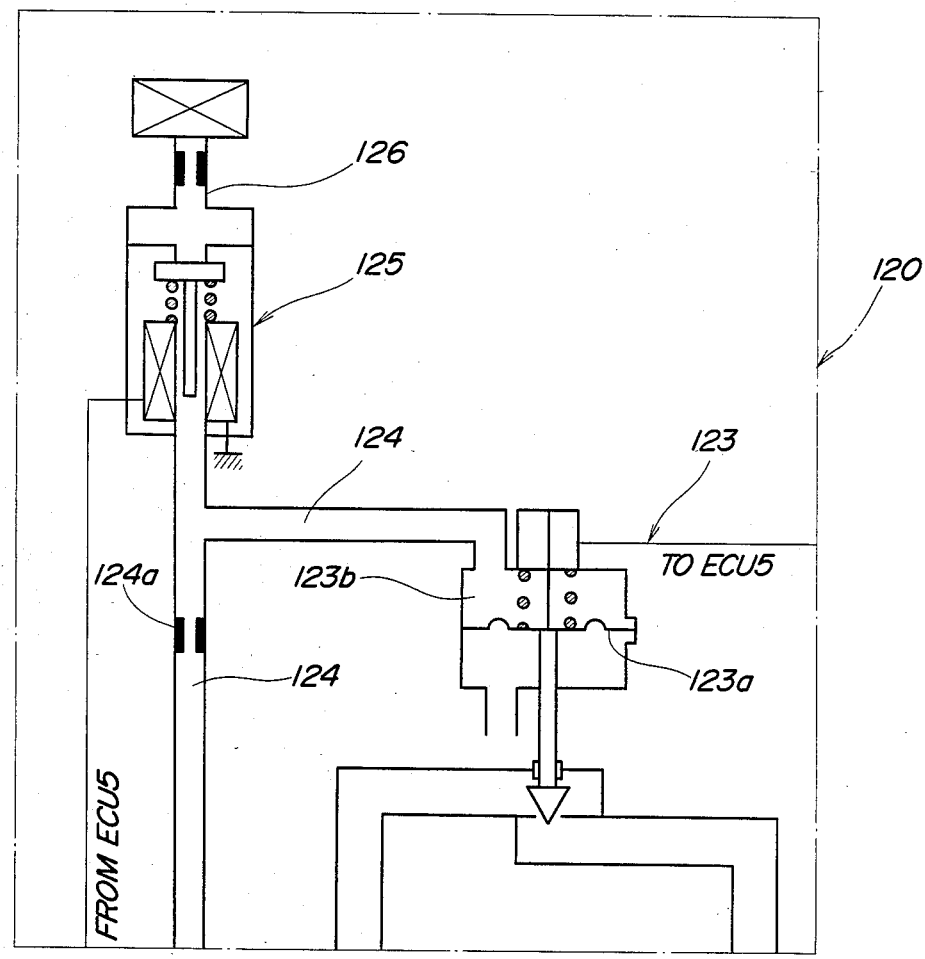
FIG. 4 is another example of a synthetic pressure-introducing arrangement of the exhaust gas recirculation control system.

FIG. 4 shows another example of the synthetic pressure-introducing arrangement applicable to the invention. A negative pressure passage 124 extends between the intake pipe 2 at a location downstream of the throttle valve 3 and the negative pressure chamber 123b, in a similar manner to the negative pressure passage 24 in FIG. 1, but it permanently communicates the interior of the intake pipe 2 with the negative pressure chamber 123. An atmospheric pressure passage 126 is connected at one end to the negative pressure passage 124 at a side closer to the negative pressure chamber 123b with respect to a restriction 124a in the passage 124, and communicated with the atmosphere via a filter and a restriction. A solenoid valve 125 is arranged across the atmospheric pressure passage 126 to selectively open and close same. The solenoid valve 125 is electrically connected to the ECU 5 to have its duty ratio controlled by a control signal from the ECU 5 in such a manner that atmospheric pressure can be introduced into the negative pressure chamber 123b only when the solenoid valve 125 is open. Thus, the synthetic pressure formed by negative pressure within the intake pipe 2 and atmospheric pressure and acting upon the diaphragm 123a can be adjusted through control of the duty ratio of the solenoid valve 125.

What is claimed is:

1. A method of controlling exhaust gas recirculation in an internal combustion engine having an exhaust passage, an intake passage, and a throttle valve arranged in said intake passage, by means of an exhaust gas recirculation control system including an exhaust recirculating passage connected between said exhaust passage and said intake passage, an exhaust gas recirculating valve arranged across said exhaust gas recirculating passage, and differential pressure-operated actuator means for varying the opening of said exhaust gas recirculating valve, said differential pressure-operated actuator means having a pressure-responsive member having one side surface acted upon by atmospheric pressure, and another side surface by a synthetic pressure of pressure within said intake passage at a zone downsteam of said throttle valve and atmospheric pressure wherein said pressure-responsive member is displaceable in response to a pressure difference between the atmospheric pressure applied to said one side surface thereof and said synthetic pressure of said intake passage pressure and atmospheric pressure, applied to said another side surface thereof, said differential pressure-operated actuator means being adapted to vary said synthetic pressure in response to at least one operating parameter of said engine to control said exhaust gas recirculating valve, the method comprising the steps of: (1) detecting the atmospheric pressure and the pressure within said intake passage at said zone downstream of said throttle valve; (2) determining a difference between the detected value of atmospheric pressure and the detected value of the pressure within said intake passage; and (3) controlling said exhaust gas recirculating valve to a fully closed position when the determined pressure difference is smaller than a predetermined value.

2. A method as claimed in claim 1, wherein said differential pressure-operated actuator means includes an atmospheric pressure passage for guiding atmospheric pressure to said one side surface of said pressure-responsive member, a negative pressure passage for guiding the pressure within said intake passage of said engine at said zone downstream of said throttle valve, to said another side surface of said pressure-responsive member, and a second atmospheric pressure passage for guiding atmospheric pressure to said another side surface of said pressure-responsive member, and a solenoid valve arranged across at least one of said negative pressure passage and said second atmospheric pressure passage, and a control circuit responsive to said at least one operating parameter of said engine for controlling said solenoid valve, to thereby control the opening of said exhaust gas recirculating valve.

3. A method as claimed in claim 2, wherein said solenoid valve is disposed to selectively guide the atmospheric pressure and the pressure within said intake passage to said another side surface of said pressure-responsive member.

4. A method as claimed in claim 2, wherein said solenoid valve is disposed to adjust the amount of one of the atmospheric pressure and the pressure within said intake passage to be supplied to said another side surface of said pressure-responsive member, while allowing permanent supply of the other of the atmospheric pressure and the pressure within said intake passage to said another side surface of said pressure-responsive member.

* * * * *